April 11, 1933.  E. J. ABBE  1,903,431
INDUSTRIAL TRUCK
Filed March 5, 1931
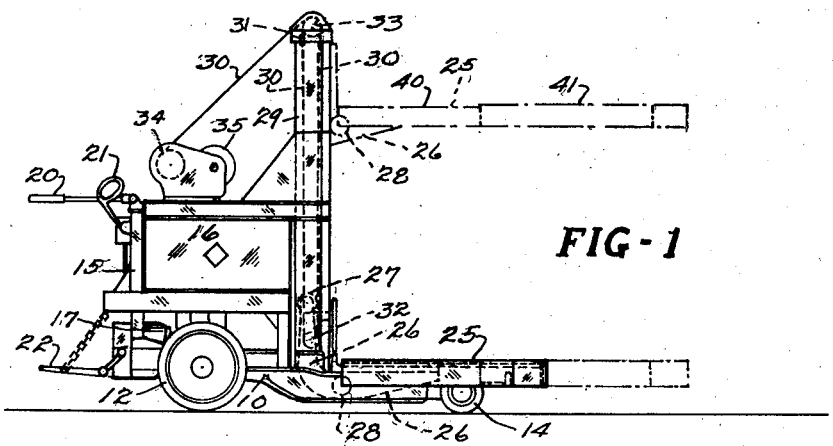
FIG-1
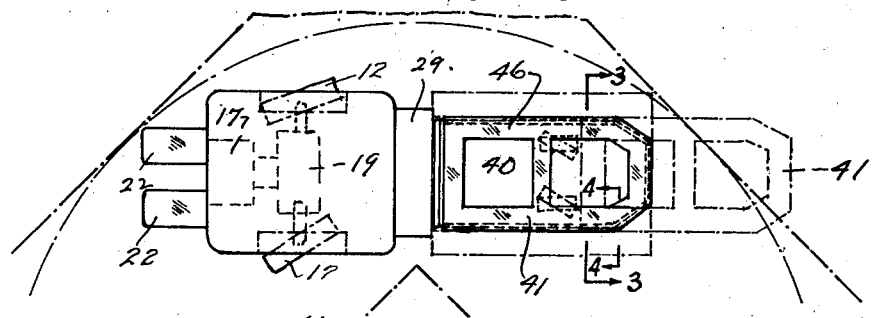
FIG-2
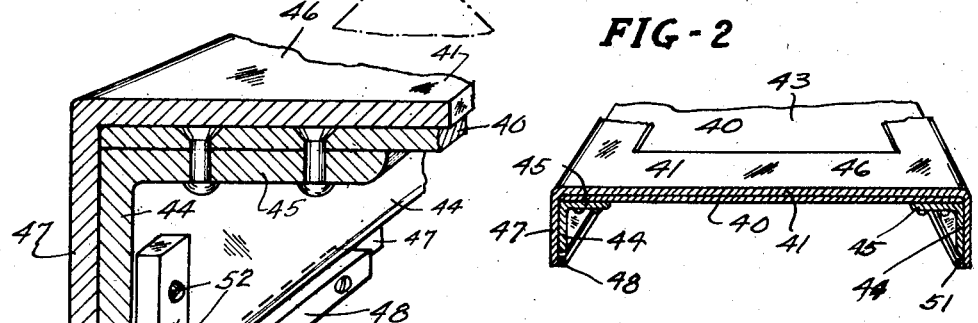
FIG-3
FIG-4
Inventor
Edward J. Abbe
By Bates, Golrick & Teare
Attorney Patented Apr. 11, 1933

1,903,431

UNITED STATES PATENT OFFICE

EDWARD J. ABBE, OF CLEVELAND, OHIO, ASSIGNOR TO THE ELWELL PARKER ELECTRIC COMPANY, OF CLEVELAND, OHIO, A CORPORATION OF OHIO

INDUSTRIAL TRUCK

Application filed March 5, 1931. Serial No. 520,257.

This invention relates to an industrial truck and especially to that type of truck having a load engaging platform adapted to support a load and transport it from place to place. In industrial establishments, it is often desirable to provide a truck which is capable of making comparatively sharp turns in restricted passageways. In many industrial installations, the passageways between the aisles, through which the truck must pass, are comparatively small. Indeed, as is sometimes the case, these passageways are too narrow to permit the truck and its load to turn therein, making it necessary for the loaded truck to detour or take a longer route to its destination. Such trucks are so designed that the platform supports the load throughout substantially its entire length. Hence it is evident that such industrial trucks must take a circuitous route on its return trip, even though the truck carries no load at that time. Likewise, when the size of the load is such that it might permit the truck and load to be turned in the restricted passageway, the load engaging platform, which is built to accommodate a maximum sized load, prevents the truck from using the restricted passageways.

Therefore, the general object of this invention is to provide an industrial truck with a load engaging platform, adapted to carry maximum sized loads, but at the same time arranged to permit the truck to be turned within a shorter turning radius when it is either unloaded or when it carries a smaller load than the maximum and therefore permit the truck to be turned in passageways in which it cannnot be turned when the truck is loaded with a maximum sized load.

Another object is to provide an industrial truck with a platform which may be adjusted to the size or length of the load.

A more specific object is to provide an industrial truck with a platform, which is telescopic in nature, so that the size of the passageway within which the truck may turn, depends upon the length of the load and wherein the load will be engaged by the load supporting surface of the truck for substantially its entire length for loads of minimum or maximum lengths.

Other objects of this invention will become apparent from the following description relating to a preferred embodiment which is illustrated in the drawing, and the essential novel features thereof will be set forth in the claims.

In the drawing, Fig. 1 is a side elevation of an industrial truck, embodying my invention; Fig. 2 is a plan of the truck; Figs. 3 and 4 are sectional perspectives, the plane of the sections being indicated by the lines 3—3 and 4—4 respectively on Fig. 2.

Referring again to the drawing, wherein an industrial truck equipped with a preferred form of my improved load supporting platform is shown, there is a main chassis or frame 10, having mounted thereon at its forward end, a pair of driving wheels 12, and adjacent its rear end a pair of relatively small load carrying wheels 14. All of the wheels in the embodiment shown are dirigibly arranged so as to turn about individual vertical axes, as indicated in Fig. 2, such an arrangement permitting the truck to be turned about in a comparatively short turning radius.

The forward end of the truck supports the propelling mechanism and the various operator's controls. Extending upwardly from the forward end of the truck is a frame structure, generally indicated at 15, which comprises a support for a suitable battery or other power supplying mechanism and certain of the operating controls. In the embodiment illustrated, a housing 16 is mounted on the frame structure 15 and is adapted to engage a suitable battery. Beneath the housing 16 is a motor 17, which, by suitable driving connections, reduction gearing, differential mechanism, etc., generally indicated at 19, connects the motor 17 to the driving wheels 12, the various operator's controls, including the steering handle 20, the motor controller 21, and pivoted platform members 22, (which comprise part of the control) are mounted in the extreme forward ends of the frame structure 15.

The load supporting platform, generally indicated at 25, is supported by a carriage 26, so mounted that it may be raised or lowered to engage and raise a load. In the construction shown, the carriage 26 carries a pair of rollers 28 at either side thereof, which rollers are adapted to engage vertically extending guideways 29, carried adjacent the rear end of the frame 15.

The carriage 26 is raised and lowered on the guideways 29 by means of a cable 30, which is secured to the guideway adjacent its uppermost end as at 31, and passes down around a sheave 32, carried by the carriage 26, and then extending upwardly around a sheave 33, carried by the guideways 29, adjacent their upward ends, and from there to a winding drum 34, which is driven by a suitable motor 35, mounted on the housing 16.

The platform 25 is so constructed that it may be lengthened to support loads of a maximum length, or may be shortened when it is either unloaded or supporting a load of less than maximum length. As shown in the drawing, the platform 25 comprises a main platform member 40, and a supplementary platform member 41, one of which is arranged in telescopic relationship with the other. In the embodiment shown, the main platform 40 comprises a relatively flat plate 43, which has downwardly extending sides 44. The sides 44 may comprise, as shown, angle bars 45, which are riveted or otherwise secured to the underside of the plate 43. This structure or main platform 40 is rigidly secured by suitable bolts or rivets (not shown), to the carriage 26, and is of such length that it will permit the truck to be turned in narrow passageways, as shown in Fig. 2.

The supplementary platform, or extension 41, is telescopically arranged relative to the main platform 40, and comprises a flat plate 46, the under surfaces of which slidably engage the main platform 40. The plate 46 is provided with downwardly extending sides 47, which embrace the sides 44 of the main platform 40, in such a manner that the supplementary platform 41 will be guided thereby when it is extended. The sides 47 extend slightly below the sides of the main platform 40, and are provided with inwardly extending ribs or bars 48, which underlie the sides 44 of the main platform 40, and when the supplementary platform 41 is in the extended position, (shown in dotted lines in Figs. 1 and 2), prevents the latter from tilting, relative to the main platform 40.

Means are provided to prevent the supplemental platform 41 from being inadvertently entirely withdrawn from the main platform 40. To this end, the bars 48 extend only a relatively short distance along the flanges 47, and at the forward ends thereof, and when extended to the maximum limit, the forward edges 50 of these bars engage stop members 51, one of which is secured to each of the flanges 44 by suitable bolts 52, the arrangement being the same on both sides of the platform.

From the foregoing description, it is apparent that I have provided an industrial truck with a load engaging surface, which may underlie substantially the entire length of loads of various sizes, and which platform may be adjusted so as not to extend beyond the extremity of the load and thereby increase the size of the passageway required for the vehicle to be turned. Thus, it will be seen, such construction will eliminate considerable mileage for trucks of this nature, which operate in industrial installations wherein many of the passageways are such that they necessitate the trucks taking a circuitous route to reach their destination when loaded with a maximum load.

I claim:

1. In an industrial truck, a main frame, wheels dirigibly arranged to support said frame, a vertical guideway mounted on said frame, a carriage slidably arranged for vertical movement in said guideway and having a forwardly extending member, means adapted to raise and lower said carriage, a load supporting platform rigidly secured to the upper surface of the forwardly extending member and having downwardly extending flanges embracing the sides of the carriage member and the frame, a supplemental platform carried by the first named platform, the two platforms being arranged so that they may be slid one relative to the other to increase or decrease the overall length of the combined platforms, and wherein the length of said platform may be increased or decreased, regardless of the position of the carriage and platform relative to the truck supporting surface.

2. In an industrial truck, a main frame, driving wheels dirigibly arranged on this frame, a pair of load supporting wheels dirigibly arranged on said frame, a load engaging platform mounted on said frame and having downwardly extending flanges, a supplemental platform slidably mounted on said main platform and having downwardly extending flanges adapted to embrace the flanges of the main platform, and means associated with said flanges of both platforms to limit the sliding movement between said platforms.

3. In an industrial truck, a main frame having a low slung forwardly extending portion, a plurality of wheels arranged to support said frame including a pair of wheels at the forward end thereof, a vertically extending guideway mounted on said frame intermediate its ends, a carriage mounted for vertical movement in said guideway and having a forwardly extending member, a load supporting platform rigidly secured to the upper surface of said member and extending beyond the side and one end of said frame and provided with downwardly extending side and end flanges embracingly arranged relative to the frame and wheels when the platform is in its lowermost position, a supplemental platform slidably mounted on the first-named platform to increase and decrease the length of the load supporting area of the carriage, said supplemental platform being provided with downwardly extending sides embracing the sides of the main platform and provided with inwardly extending portions arranged to engage the under surface of the side flanges of the main platform, and a stop carried by the main platform and arranged to engage the inwardly extending portion of the flanges of the supplemental platform to limit its sliding movement in one direction, and means including the end flanges of said platforms to limit the sliding movement in the other direction.

In testimony whereof, I hereunto affix my signature.

EDWARD J. ABBE.